Figure 1:
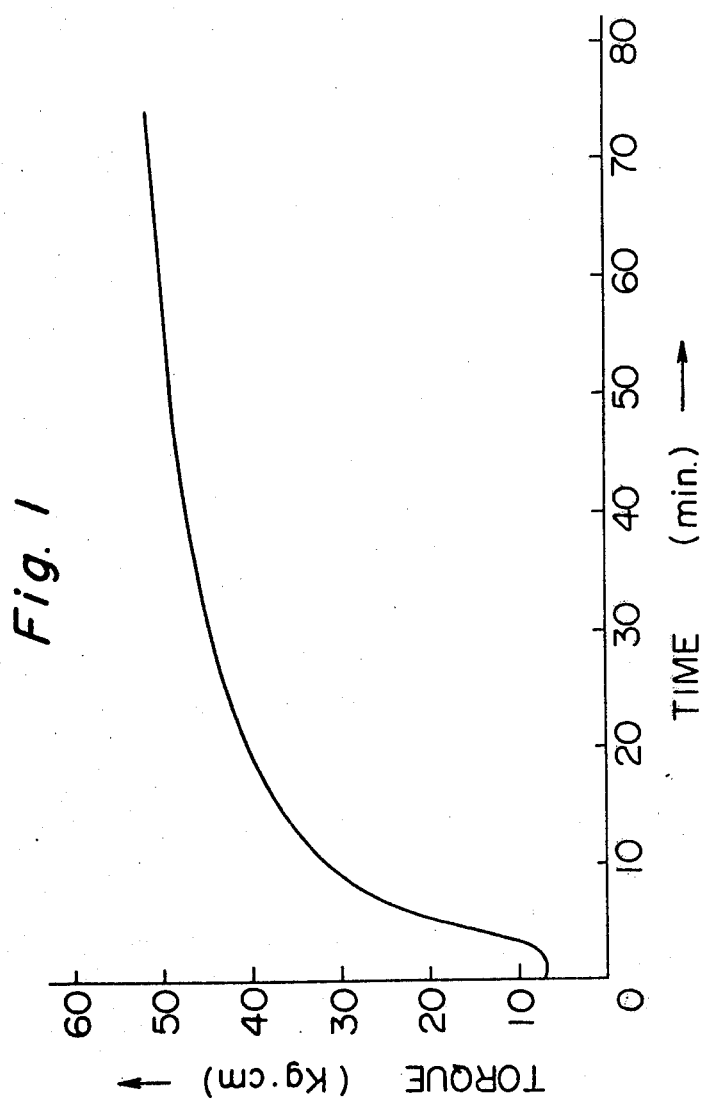

United States Patent [19]

Onizawa

[11] 4,018,750

[45] Apr. 19, 1977

[54] CURABLE COMPOSITIONS CONTAINING CHLOROPRENE RUBBER

[75] Inventor: Masao Onizawa, Ohmiya, Japan

[73] Assignee: Sanyo Trading Co., Ltd., Tokyo, Japan

[22] Filed: Jan. 29, 1976

[21] Appl. No.: 653,630

[30] Foreign Application Priority Data

Feb. 3, 1975 Japan ............................... 50-13329
June 24, 1975 Japan ............................... 50-76807

[52] U.S. Cl. .............................. 260/78 A; 526/17; 526/49
[51] Int. Cl.² .......................................... C08F 8/32
[58] Field of Search ............... 260/78 A; 526/17, 49

[56] References Cited

UNITED STATES PATENTS

| | | | |
|---|---|---|---|
| 3,091,603 | 5/1963 | Kuntz | 526/49 |
| 3,228,904 | 1/1966 | Morris et al. | 526/49 X |
| 3,491,079 | 1/1970 | Edwards | 526/49 |
| 3,544,532 | 12/1970 | Jones et al. | 526/49 X |

*Primary Examiner*—William F. Hamrock
*Attorney, Agent, or Firm*—Wenderoth, Lind & Ponack

[57] ABSTRACT

A vulcanizable composition comprising a chloroprene rubber and at least one amino acid selected from the group consisting of arginine, lysine, hydroxylysine, ornithine, cystine, asparagine, glutamine and citrulline, and further optionally, at least one metal oxide selected from the group consisting of magnesium oxide and zinc oxide. This invention provides also a vulcanizable composition comprising a chloroprene rubber, at least one amino acid selected from the group consisting of tyrosine, threonine, tryptophan, proline and hydroxyproline, and at least one metal oxide selected from the group consisting of magnesium oxide and zinc oxide.

3 Claims, 4 Drawing Figures

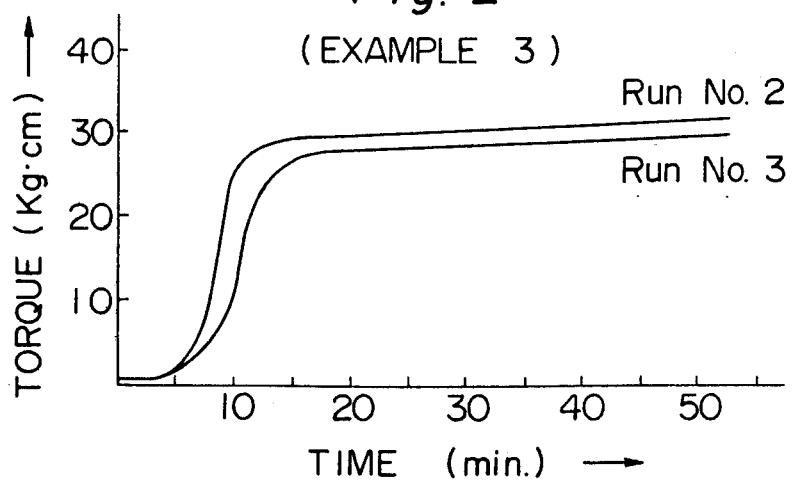
*Fig. 2* (EXAMPLE 3)
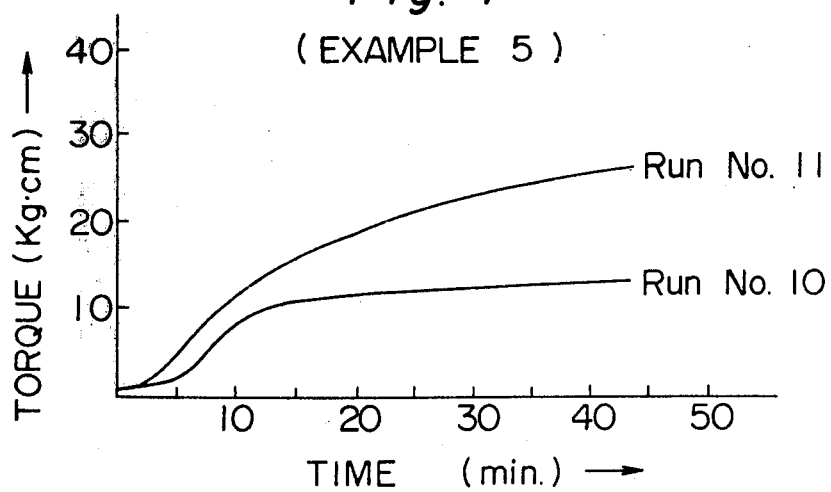
*Fig. 4* (EXAMPLE 5)

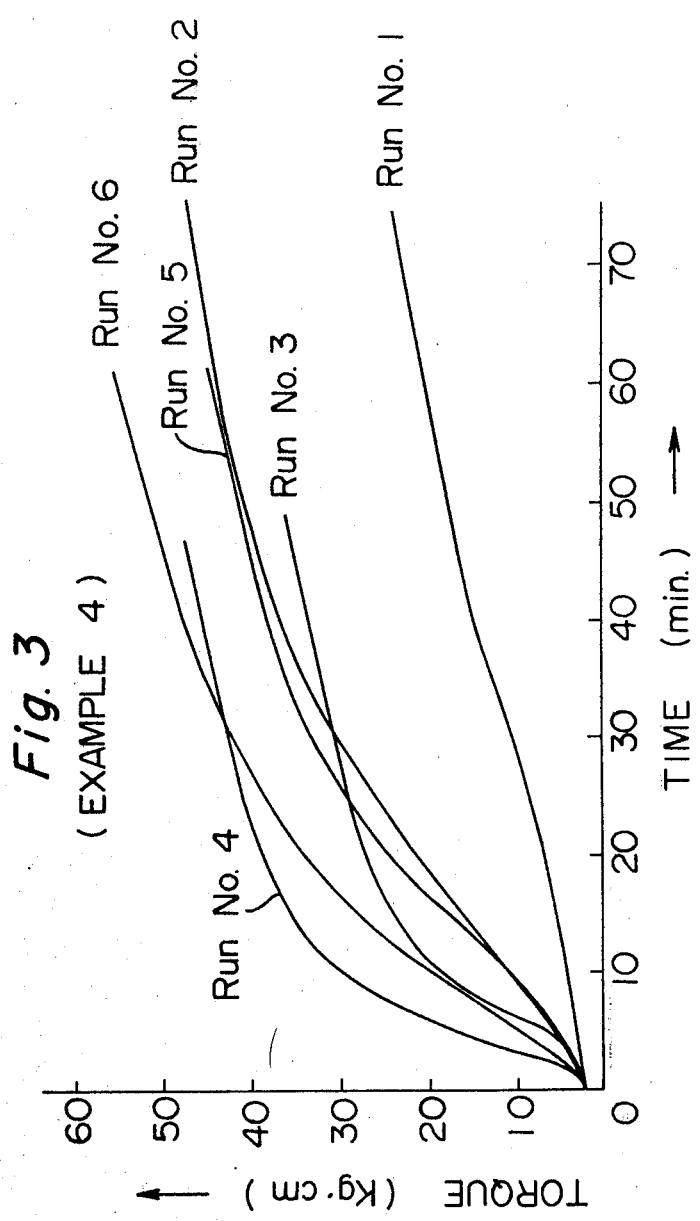
Fig. 3 (EXAMPLE 4)

CURABLE COMPOSITIONS CONTAINING CHLOROPRENE RUBBER

This invention relates to a vulcanizable composition comprising a chloroprene rubber and an amino acid, and a cured chloroprene rubber obtained therefrom.

Heretofore, metal oxides such as magnesium oxide, zinc oxide and lead oxide have been known as vulcanized agents for chloroprene rubbers, and a combination of zinc oxide and magnesium oxide has gained most widespread acceptance. In commercial operations, these known vulcanizers need to be used together with vulcanization accelerators in order to shorten the vulcanization time to an economically feasible one and impart good properties to the resulting vulcanized rubber. Various species of the vulcanizing accelerators are known, but 2-mercaptoimidazoline has proved to be an especially superior accelerator and come into almost exclusive commercial use. Recent investigations, however, have ascertained the tumorigenic and teratogenetic properties of the 2-mercaptoimidazoline, as reported in Journal of The National Cancer Institute, Vol. 42, page 1101 (1969) and Rubber World, Januray 1975, page 41, and it has been strongly desired to develop vulcanizers which do not require the conjoint use of such a vulcanization accelerator.

The metal oxide vulcanizers remain in the final rubber products, and may ooze during use to become hazardous to the human health. Accordingly, this toxic hazard has precluded such rubber goods from applications in the fields of medicines and foodstuffs in the form of, for example, bottles of stoppers, and has also limited the utility of the final rubber goods. Furthermore, during the processing of rubber, the metal oxide powder scatters off and may cause adverse effects to the health of the working personnel. It is very desirable therefore to develop non-toxic vulcanizers that can replace the conventional metal oxide vulcanizers.

It has now been found that a certain kind of amino acid (to be referred to as a first kind of amino acid) has a superior vulcanizing action on chloroprene rubbers, and another kind of amino acid (to be referred to as a second kind of amino acid) has a superior vulcanization accelerating action on metal oxide vulcanizers although it does not possess a vulcanizing action on chloroprene rubbers. This discovery led to the solution of the above-mentioned problems.

According to this invention, there is first provided a vulcanizable composition comprising a chloroprene rubber and at least one amino acid (belonging to the first kind of amino acid described above) selected from the group consisting of arginine, lysine, hydroxylsine, ornithine, cystine, asparagine, glutamine and citrulline.

According to another aspect of the invention, there is provided a curable composition comprising a chloroprene rubber, at least one amino acid selected from the group consisting of arginine, lysine, hydroxylsine, ornithine, cystine, asparagine, glutamine and citrulline, and at least one metal oxide selected from the group consisting of magnesium oxide and zinc oxide.

The invention further provides a curable composition comprising a chloroprene rubber, at least one amino acid (the second kind of amino acid described above) selected from the group consisting of tyrosine, threonine, tryptophan, proline and hydroxyproline, and at least one metal oxide selected from the group consisting of magnesium oxide and zinc oxide.

The present invention also provides vulcanized rubbers obtained by vulcanizing the aforesaid vulcanizable compositions.

FIGS. 1 to 4 of the accompanying drawings represent the vulcanization curves of the rubber compositions described in Examples of the present invention to be given hereinbelow.

The present invention will be described below in greater detail.

A first preferred embodiment of the present invention is a composition comprising a chloroprene rubber and a vulcanizing agent consisting only of a first kind of amino acid. It was not known prior to the present invention that since the first kind of amino acid defined in the present invention has a superior vulcanizing action on chloroprene rubbers even when used alone, the use of this amino acid alone as a vulcanizing agent can lead to the vulcanization of chloroprene rubbers. While the conventional metal oxide vulcanizers require the conjoint use of vulcanization accelerators, it is surprising that some preferred amino acids of the first kind specified in the present invention, for example, ornithine or lysine, afford a very high rate of vulcanization in the absence of culcanization accelerators, and the resulting vulcanized rubbers have good properties. The composition of this invention comprising a chloroprene rubber and a vulcanizer consisting only of an amino acid of the first kind does not contain a metal oxide, and therefore has an important significance in that it increases the utility of chloroprene rubbers and enables them to be used in the fields of medicines and foodstuffs.

A mixed vulcanizer consisting of a mixture of an amino acid of the first kind and magnesium oxide and/or zinc oxide is also very good vulcanizer for chloroprene rubbers. Hence, a composition comprising a chloroprene rubber and the mixed vulcanizer is a second preferred embodiment of the present invention. In fact, as will be shown in Example 4 below, the mixed vulcanizer consisting of the first kind of amino acid and the metal oxide affords an increased rate of vulcanization, and gives vulcanized rubbers having good properties as compared with a vulcanizer consisting only of the corresponding amino acid of the first kind. Since this mixed vulcanizer contains a metal oxide, the resulting vulcanized rubber should not be used in the fields of medicines or foodstuffs. However, in fields which do not require any consideration of such health regulations, this mixed vulcanizer becomes a very superior novel vulcanizer for chloroprene rubbers. Moreover, it offers an important advantage that unlike the conventional vulcanizer for chloroprene rubbers, the mixed vulcanizer in accordance with this invention does not require a vulcanization accelerator such as 2-mercaptoimidazoline.

Chloroprene rubbers used in this invention are known per se. The chloroprene rubbers are classified into sulfur-modified type rubbers and non sulfur modified type rubbers, but in the present invention, both types of chloroprene rubbers can be used as required. Chloroprene rubbers carboxylated with an acidic monomer such as methacrylic acid can also be used. The chloroprene rubbers used in this invention may be in the form of solid or latex.

Vulcanization of chloroprene rubbers with the vulcanizer consisting only of the amino acid or both the amino acid or magnesium oxide and/or zinc oxide can be carried out under the temperature (for example, 140° to 180° C) and pressure conditions usually employed for chloroprene rubbers.

When the vulcanizer consisting only of the amino acid is used, its amount (the total amount of the amino acid) is 0.01 to 50 parts by weight, preferably 0.5 to 20 parts by weight, per 100 parts by weight of the chloroprene rubber. When the mixed vulcanizer consisting of the amino acid and the metal oxide is used, the amout of the metal oxide is 0.01 to 30 parts by weight, preferably 0.1 to 5.0 parts by weight, per part by weight of the entire amino acid, and the amount of the mixed vulcanizer is 0.06 to 50 parts by weight, preferably 0.6 to 15 parts by weight, per 100 parts by weight of the chloroprene rubber.

A vulcanizable composition comprising an amino acid of the second kind defined hereinabove, a chloroprene rubber and a metal oxide selected from the group consisting of magnesium oxide and zinc oxide is a third preferred embodiment of the present invention. Unlike the first kind of amino acid, the second kind of amino aid does not substantially exhibit a vulcanizing action on chloroprene rubbers when used alone, but exhibits a marked effect of accelerating the vulcanization of chloroprene rubbers with the metal oxide vulcanizer. It is therefore used as a novel vulcanization accelerator in place of the known vulcanization accelerators such as 2-mercaptoimidazoline. The amino acids of the second kind are quite harmless to the human health. In spite of the recognition that 2-mercaptoimidazoline causes a toxic hazard to humans, the rubber industry has stuck to it in commercial operations because of the failure to find any suitable non-toxic substitute. The discovery of the aforesaid non-toxic and superior vulcanization accelerators by the present invention, therefore, is an important contribution to rubber technology and has marked a notable advance in the rubber industry.

Vulcanization of chloroprene rubbers with the vulcanizer consisting of the second kind of amino acid and the metal oxide can be carried out under the conventional temperature (for example, 140° to 180° C) and pressure conditions used for chloroprene rubbers.

The amount of the metal oxide is 0.01 to 30 parts by weight, preferably 0.1 to 5.0 parts by weight, per part by weight of the total amount of the amino acid, and the amount of the mixed vulcanizer is 0.1 to 50 parts by weight, preferably 1 to 15 parts by weight, per 100 parts by weight of the chloroprene rubber.

In any of the three embodiments of the vulcanizable compositions of this invention, other conventional compounding chemicals, such as reinforcing agent, processing aid, pigment, softening agent or plasticizer, can be incorporated as required.

Vulcanized chloroprene rubbers obtained by vulcanizing the vulcanizable compositions of this invention can be conveniently used in various applications, for example, cable and wire coverings, printing rolls, window frames, antivibratory rubbers, hoses, belts, rubber-coated cloths, sponges, shoe soles, and linings.

The following Examples further illustrate the present invention. Unless otherwise indicated, all parts are by weight.

The various properties shown in the Examples were measured by the following test methods.

Tensile strength, elongation and modulus

The measurement is made in accordance with JIS K-6301 using a Schopper type tensile tester at a pulling speed of 500 mm/min.

Hardness

The measurement is made in accordance with JIS K-6301 using a JIS-A type hardness tester.

EXAMPLE 1

| Chloroprene rubber *(1) | 100 Parts |
|---|---|
| SRF carbon black *(2) | 40 |
| TE-58A *(3) | 1.5 |
| Arginine | 4.3 |
| 50% Aqueous solution of lysine | 3.2 |

The chloroprene rubber *(1) was Skyprene B-10 (a registered trademark for a non sulfur-modified type chloroprene rubber produced by Toyo Soda Kogyo Kabushiki Kaisha). The SRF carbon black *(1) was semi-reinforcing furnace carbon black added as a reinforcing agent. The TE-58A *(3) was a product of Technical Processing Company, U.S.A. which was an alkali metal salt of a higher fatty acid added as a processing aid.

The above ingredients were compounded ant the resulting composition vulcanized, in accordance with the conventional methods shown below.

The chloroprene rubber was wound onto 8-inch open rolls with a roll interspace of 1.4 mm. The surface temperature of the rolls was maintained at 50° ± 5° C. When the surface of the rubber became even, a predetermined amount of carbon black was added occasionally so that the surface of the rolls became uniform. The addition was effected while adjusting the roll interspace occasionally so that the bank of the roll became constant. After the addition, TE-58A was added, and then a mixture of the lysine ad arginine.

After the addition, three three-fourths cuts were effected each way, and the batch was cut from the roll and rolled up. The roll interspace was narrowed to 0.7 mm, and the rolled stock was passed endwise through the open rolls six times. The batch was released, and aged for one day. After aging, the rolled stock was passed endwise six times through the same open rolles as used in mixing whose surface temperature was maintained at 50° ± 5° C. and whose interspace was 1.4 mm. Then, the batch was wound onto the rolls and subjected to three three-fourths cuts each way. The rubber compound obtained was sheeted, and vulcanized for 30 minutes by means of a steam press at 160° C.

The properties of the resulting vulcanized rubber as shown in Table 1.

Table 1

| Tensile strength (Kg/cm$^2$) | 116 |
|---|---|
| Elongation (%) | 530 |
| Hardness | 60 |
| 300% Modulus (Kg/cm$^2$) | 60 |

The experimental results shown in Table 1 demonstrate that the chloroprene rubber can be vulcanized with a mixture of lysine and arginine.

EXAMPLE 2

For this Example shows the results of experiments in which a non sulfur-modified type chloroprene was vulcanized with other amino acids of the first kind as a vulcanizer. Table 2 shows compounds used which were prepared using open rolls in the same way as in Example 1. The vulcanizing conditions for the compound were the same as in Example 1. In Runs Nos. 1 to 3, Skyprene B-10 (registered trademark) was used as the chloroprene rubber, and in Run No. 4, Skyprene B-30 (a registered trademark for a non sulfur-modified type chloroprene rubber made by Toyo Soda Kogyo Kabushiki Kaisha). The properties of the resulting vulcanized rubbers are shown in Table 2.

A vulcanization curve of the compound prepared in Run No. 1 was drawn by means of an oscillating disc rheometer with the temperature adjusted to 160° C., and shown in FIG. 1. FIG. 1 shows that after a suitable length of induction period (about 3 minutes), an abrupt rise in torque occurs. This substantiates that ornithine is very preferable as a vulcanizer. Generally, the preferred induction time in vulcanization is neither short nor long, and the induction period of about 3 minutes is desirable from the viewpoint of both operation and economy. Furthermore, since an abrupt rise in torque can lead to the shortening of the heating time, it is economically very advantageous.

Table 2

| Run No. | 1 | 2 | 3 | 4 |
|---|---|---|---|---|
| Chloroprene rubber | 100 parts | 100 parts | 100 parts | 100 parts |
| SRF carbon black *(2) | 40 | 40 | 40 | 40 |
| TE-58A *(3) | 3 | 3 | 4 | 5 |
| Ornithine 50% aqueous solution | 3 | — | — | — |
| Lysine 50% aqueous solution | — | 3 | — | — |
| Glutamine | — | — | 6 | — |
| Asparagine | — | — | — | 5 |
| Tensile strength (Kg/cm$^2$) | 172 | 154 | 110 | 139 |
| Elongation (%) | 300 | 460 | 560 | 530 |
| Hardness | 37 | 52 | 50 | 60 |
| 300% Modulus (Kg/cm$^2$) | 172 | 89 | 47 | 61 |

*(2) and *(3) were the same as in Example 1.

shows compounds used which were prepared in the same way as in Example 1 and then vulcanized under the same conditions as in Example 1. The properties of the resulting vulcanized rubbers are shown in Table 3. Vulcanization curves of the compounds in Runs Nos. 2 and 3 were prepared in the same way as in Example 2, and are shown in FIG. 2.

Table 3

| Run No. | 1 | 2 | 3 |
|---|---|---|---|
| Chloroprene rubber *(1) | 100 parts | 100 parts | 100 parts |
| SRF carbon black *(2) | 40 | 40 | 40 |
| TE-58A *(3) | 1.5 | 5 | 5 |
| Arginine | 4.3 | — | — |
| Lysine 50% aqueous solution | 3.2 | — | — |
| Citrulline | — | 5 | — |
| Cystine | — | — | 5 |
| Tensile strength (Kg/cm$^2$) | 149 | 159 | 156 |
| Elongation (%) | 540 | 380 | 610 |
| Hardness | 56 | 57 | 48 |
| 300% Modulus (Kg/cm$^2$) | 88 | 114 | 54 |

*(1) was Skyprene R-22 (registered trademark for sulfur-modified type chloroprene rubber made by Toyo Soda Kogyo Kabushiki Kaisha). *(2) and *(3) were the same as in Example 1.

EXAMPLE 4

This Example shows the results of experiments in which chloroprene rubber was vulcanized with a mixed vulcanizer consisting of an amino acid of the first kind and a metal oxide. Table 4 shows compounds used which were prepared in the same way as in Example 1, and then vulcanized under the vulcanizing conditions shown in Table 4. The properties of the resulting vulcanized rubbers are shown in Table 4. Table 4 also shows the experimental results obtained with the use of the first kind of amino acid alone as a vulcanizer for comparative purposes. Vulcanization curves for Runs Nos. 1 to 6 were prepared in the same way as in Example 2, and are shown in FIG. 3.

Table 4

| Run No. | 1 | 2 | 3 | 4 | 5 | 6 |
|---|---|---|---|---|---|---|
| Chloroprene *(1) | 100 parts | 100 parts | 100 parts | 100 parts | 100 parts | 100 parts |
| SRF carbon black *(2) | 40 | 40 | 50 | 50 | 60 | 60 |
| TE-58A *(3) | 1.5 | 1.5 | 4 | 4 | 5 | 5 |
| MgO | — | 5 | — | — | — | 5 |
| ZnO | — | — | — | 5 | — | 5 |
| Arginine | 2.5 | 2.5 | — | — | — | — |
| Lysine 50% aqueous solution | 2.5 | 2.5 | — | — | 5 | 5 |
| Ornithine 50% aqueous solution | — | — | 4 | 4 | — | — |
| Vulcanization conditions | | | | | | |
| Temperature (° C) | 160 | 160 | 160 | 160 | 160 | 160 |
| Time (minutes) | 30 | 30 | 20 | 15 | 15 | 15 |
| Method | steam press | steam press | electro-thermal press | electro-thermal press | electro thermal press | electro-thermal press |
| Tensile strength (Kg/cm$^2$) | 110 | 184 | 139 | 181 | 130 | 165 |
| Elongation (%) | 490 | 420 | 360 | 340 | 370 | 310 |
| Hardness | 60 | 68 | 54 | 60 | 58 | 72 |
| 300% Modulus (Kg/cm$^2$) | 65 | 141 | 121 | 158 | 105 | 160 |

*(1) was Skyprene B-10 (registered trademark) in Runs Nos. 1 to 4, and Skyprene B-30 (registered trademark)

EXAMPLE 3

This example shows the results of experiments wherein sulfur-modified type chloroprene rubber was vulcanized with an amino acid of the first kind. Table 3

The results shown in Table 4 and FIG. 3 demonstrate that the mixed vulcanizer, in comparison with the vulcanizer consisting only of the first kind of amino acid, affords a higher rate of vulcanization and gives vulcanized rubbers having higher tensile strength, hardness and 300% modulus.

EXAMPLE 5

This Example shows the results of experiments wherein chloroprene rubber was vulcanized with a mixed vulcanizer consisting of an amino acid of the second kind and a metal oxide. Table 5 shows compounds used which were prepared in the same way as in Exaple 1, and vulcanized under the same conditions as in Example 1. Run No. 9 is a comparison which used histidine not belonging to any of the amino acids of the first and second kinds specified in the present invention. The properties of the resulting vulcanized rubbers are shown in Table 5. Vulcanization curves of the compounds in Runs Nos. 10 and 11 were prepared in the same way as in Example 2, and are shown in FIG. 4.

The results shown in Table 5 and FIG. 4 demonstrate that when the mixed vulcanizer consisting of the second kind amino acid and the metal oxide is used, the rate of vulcanization becomes high and the tensile strength, and 300% modulus of the vulcanized rubbers are improved as compared with the case of using only the metal oxide as a vulcanizer. The results also show that when histidine outside the scope of the present invention is used, the tensile strength and 300% modulus of the vulcanized rubber are deteriorated.

What we claim is:

1. A vulcanizable composition comprising a chloroprene rubber and at least one amino acid selected from the group consisting or arginine, lysine, hydroxylysine, ornithine, cystine, asparagine, glutamine and citrulline.

2. The composition of claim 1 wherein the total amount of the amino acid is 0.01 to 50 parts by weight per 100 parts by weight of the chloroprene rubber.

3. A vulcanized rubber obtained by vulcanizing the vulcanizable composition of claim 1.

Table 5

| Run No. | 1 | 2 | 3 | 4 | 5 | 6 | 7 | 8 | (Comparison) 9 | 10 | 11 | 12 | 13 |
|---|---|---|---|---|---|---|---|---|---|---|---|---|---|
| Chloroprene rubber *(1) | 100 parts | 100 parts | 100 parts | 100 parts | 100 parts | 100 parts | 100 parts | 100 parts | 100 parts | 100 parts | 100 parts | 100 parts | 100 parts |
| SRF-L carbon black *(2) | 40 | 40 | 40 | 40 | 40 | 40 | 40 | 40 | 40 | 40 | 40 | 40 | 40 |
| TE-58A *(3) | 5 | 5 | 5 | 5 | 5 | 5 | 5 | 5 | 5 | 5 | 5 | 5 | 5 |
| Metal oxide ZnO | 5 | 5 | 5 | — | — | — | 5 | 5 | 5 | 5 | 5 | 5 | 5 |
| MgO | — | — | — | 5 | tr 5 | 5 | 5 | 5 | 5 | — | — | — | — |
| Amino acid Parts | — | 5 | 5 | — | 5 | 5 | — | 5 | 5 | — | 5 | — | 5 |
| Type | — | Tyrosine | Tripropphan | — | Threonine | Triptophan | — | Proline | Histidine | — | Proline | — | Proline |
| Tensile strength (Kg/cm$^2$) | 148 | 168 | 165 | 113 | 142 | 131 | 120 | 136 | 92 | 125 | 157 | 174 | 175 |
| Elongation (%) | 580 | 530 | 520 | 720 | 510 | 660 | 680 | 490 | 680 | 560 | 440 | 430 | 380 |
| Hardness | 52 | 53 | 57 | 52 | 56 | 56 | 53 | 67 | 54 | 50 | 53 | 56 | 60 |
| 300% Modulus | 43 | 61 | 62 | 29 | 63 | 47 | 35 | 71 | 28 | 43 | 89 | 106 | 137 |

*(1) was Skyprene B-10 (registered trademark) in Runs Nos. 1 to 9, Skyprene B-30 (registered trademark) in Runs Nos. 10 and 11, and Skyprene R-22 (registered trademark) in Runs Nos. 12 and 13.
*(2) was semi-reinforcing furnace low structure carbon black used as a reinforcing agent.
*(3) was the same as in Example 1.

* * * * *